US011837911B2

(12) United States Patent
Matsumoto et al.

(10) Patent No.: US 11,837,911 B2
(45) Date of Patent: Dec. 5, 2023

(54) POWER SUPPLY CONTROL APPARATUS AND POWER SUPPLY CONTROL METHOD

(71) Applicant: DENSO TEN Limited, Kobe (JP)

(72) Inventors: Takeshi Matsumoto, Kobe (JP); Daiki Hakushima, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 82 days.

(21) Appl. No.: 17/700,070

(22) Filed: Mar. 21, 2022

(65) Prior Publication Data
US 2023/0077421 A1 Mar. 16, 2023

(30) Foreign Application Priority Data

Sep. 13, 2021 (JP) .................... 2021-148882

(51) Int. Cl.
*H02J 9/06* (2006.01)
*H02J 1/08* (2006.01)
*H02J 1/02* (2006.01)
*H02H 3/16* (2006.01)

(52) U.S. Cl.
CPC ............. *H02J 9/061* (2013.01); *H02H 3/16* (2013.01); *H02J 1/02* (2013.01); *H02J 1/086* (2020.01)

(58) Field of Classification Search
CPC ...... H02J 9/061; H02J 9/06; H02J 9/04; H02J 9/02; H02J 9/068; H02J 1/086; H02J 1/10; H02J 1/102; H02J 1/106; H02J 1/02; H02H 3/16; H02H 3/20; H02H 3/167; H02H 3/202; H02H 3/14; H02H 3/10
See application file for complete search history.

(56) References Cited

U.S. PATENT DOCUMENTS

2017/0080883 A1* 3/2017 Yasunori ........... H02J 7/007182
2018/0001850 A1* 1/2018 Kontani .................... H02J 1/08
2019/0115175 A1* 4/2019 Saito .................... H02H 1/0007

FOREIGN PATENT DOCUMENTS

JP 2019-062727 A 4/2019

* cited by examiner

*Primary Examiner* — Nguyen Tran
(74) *Attorney, Agent, or Firm* — Oliff PLC

(57) ABSTRACT

A power supply control apparatus includes: a first system configured to supply electric power of a first power supply to a first load; a second system configured to supply electric power of a second power supply to a second load; an inter-system switch provided in a connection path that connects the first system to the second system, and capable of connecting the first system to the second system and disconnecting the first system from the second system; a primary ground fault detection unit configured to cut off the inter-system switch when a ground fault of the first system or the second system is detected by the primary ground fault detection unit; a secondary ground fault detection unit as defined herein; and a mask processing unit as defined herein.

14 Claims, 13 Drawing Sheets

POWER SUPPLY CONTROL APPARATUS AND POWER SUPPLY CONTROL METHOD

CROSS-REFERENCE TO RELATED APPLICATION

This application is based on and claims priority under 35 USC 119 from Japanese Patent Application No. 2021-148882 filed on Sep. 13, 2021.

TECHNICAL FIELD

The disclosed embodiment relates to a power supply control apparatus and a power supply control method.

BACKGROUND ART

In the related art, there is a redundant power supply system including a first system that supplies electric power of a first power supply to a first load, a second system that supplies electric power of a second power supply to a second load, and an inter-system switch that connects the first system and the second system. When the redundant power supply system detects that a voltage of the first system or the second system decreases to less than a ground fault determination threshold, the redundant power supply system cuts off the inter-system switch and specifies a system where a ground fault occurs (for example, see JP-A-2019-62727).

When the voltages of the first system and the second system return to a value equal to or larger than the ground fault determination threshold within a predetermined time after the inter-system switch is cut off, the redundant power supply system determines to be normal, and reconnects the inter-system switch so as to return to a normal control.

SUMMARY OF INVENTION

However, in the redundant power supply system, when the voltage of the first power supply is in the vicinity of the ground fault determination threshold due to aging degradation or failure of the first power supply, a decrease to a value less than the ground fault determination threshold and a return to the value equal to or larger than the ground fault determination threshold are repeated. Therefore, the connection and cutoff of the inter-system switch are repeated, and durability of the inter-system switch is reduced.

An aspect of the embodiment has been made in view of the above circumstance, and an object thereof is to provide a power supply control apparatus and a power supply control method capable of suppressing a decrease in durability of an inter-system switch.

A power supply control apparatus according to an aspect of the embodiment includes a first system, a second system, an inter-system switch, a primary ground fault detection unit, a secondary ground fault detection unit, and a mask processing unit. The first system supplies electric power of a first power supply to a first load. The second system supplies electric power of a second power supply to a second load. The inter-system switch is provided in a connection path that connects the first system to the second system, and is capable of connecting and disconnecting the first system to/from the second system. When a ground fault of the first system or the second system is detected by the primary ground fault detection unit, the primary ground fault detection unit cuts off the inter-system switch. When a ground fault is detected by the primary ground fault detection unit, the secondary ground fault detection unit monitors the first system or the second system where the ground fault continues for a predetermined period, and when the ground fault is eliminated, the secondary ground fault detection unit reconnects the inter-system switch. The mask processing unit sets a cutoff prohibition period when the inter-system switch is reconnected, and prohibits cutoff of the inter-system switch by the primary ground fault detection unit during the cutoff prohibition period.

The power supply control apparatus and the power supply control method according to an aspect of the embodiment have an effect of being able to suppress a decrease in the durability of the inter-system switch.

DETAILED DESCRIPTION OF THE INVENTION

Hereinafter, an embodiment of a power supply control apparatus and a power supply control method will be described in detail with reference to the accompanying drawings. The present invention is not limited to the following embodiment. Hereinafter, a power control apparatus mounted on a vehicle that has an automated driving function and supplying electric power to a load will be described as an example, but the power supply control apparatus according to the embodiment may be mounted on a vehicle that does not have the automated driving function.

Further, although a case where the vehicle on which the power supply control apparatus is mounted is an electric vehicle or a hybrid vehicle will be described, the vehicle on which the power supply control apparatus is mounted may be an engine vehicle traveling by an internal combustion engine.

The power supply control apparatus according to the embodiment includes a first power supply and a second power supply. When a power supply failure occurs in a power supply system of either the first power supply or the second power supply, the power supply control apparatus may be mounted on any apparatus that backs up the first power supply by the other power supply system.

[1. Configuration of Power Supply Control Apparatus]

Figure 1:
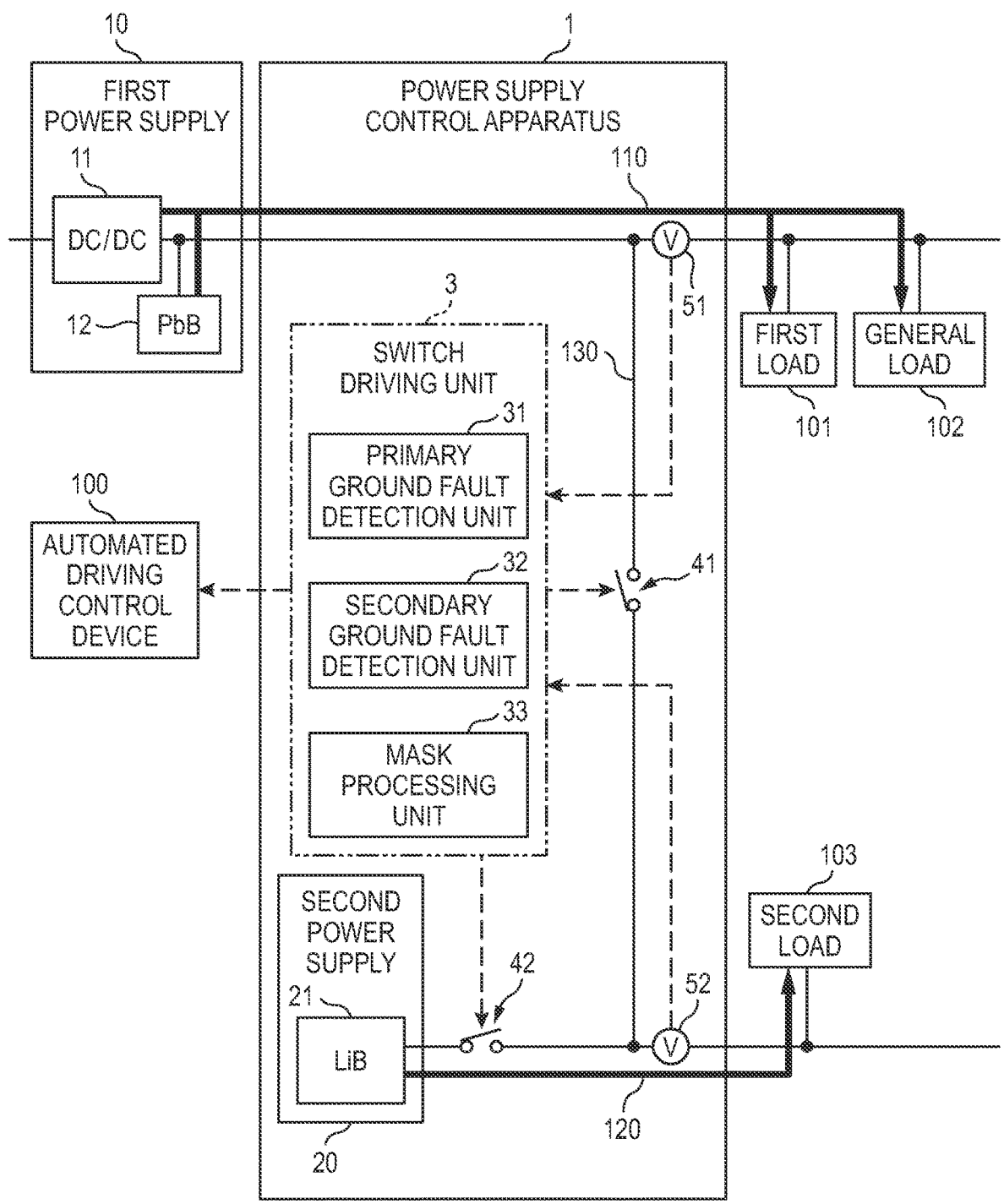
FIG. 1 is an illustrative diagram illustrating a configuration example of a power supply control apparatus according to an embodiment.

FIG. 1 is an illustrative diagram illustrating a configuration example of the power supply control apparatus according to the embodiment. As illustrated in FIG. 1, a power supply control apparatus 1 according to the embodiment is connected to a first power supply 10, a first load 101, a general load 102, a second load 103, and an automated driving control device 100. The power supply control apparatus 1 includes a first system 110 that supplies electric power of the first power supply 10 to the first load 101 and the general load 102, and a second system 120 that supplies electric power of a second power supply 20, which will be described later, to the second load 103.

The first load 101 includes a load for automated driving. For example, the first load 101 includes a steering motor, an electric brake device, an in-vehicle camera, and the like that operate during the automated driving. The general load 102 includes, for example, a display, an air conditioner, an audio, a video, and various lights.

The second load 103 includes a part of the automated driving function of the first load 101. For example, the second load 103 includes minimum necessary devices for fail operation (FOP) such as a steering motor, an electric brake device, and a radar. The first load 101, the general load 102, and the second load 103 are operated by the electric power supplied from the power supply control apparatus 1.

The automated driving control device 100 is a device that performs automated driving control on the vehicle. The automated driving control device 100 causes the vehicle to travel by automated driving by operating the first load 101 and the second load 103. Further, the automated driving control device 100 can perform the FOP by the second load 103 in a case where a ground fault occurs in the first system 110 during the automated driving, and can perform the FOP by the first load 101 in a case where a ground fault occurs in the second system 120.

The first power supply 10 includes a DC/DC converter (hereinafter, referred to as "DC/DC 11") and a lead battery (hereinafter, referred to as a "PbB 12"). A battery of the first power supply 10 may be any secondary battery other than the PbB 12.

The DC/DC 11 is connected to a generator and a high-voltage battery having a voltage higher than that of the PbB 12, steps down the voltages of the generator and the high-voltage battery, and outputs the stepped-down voltages to the first system 110. The generator is, for example, an alternator that converts kinetic energy of a traveling vehicle into electricity to generate electricity. The high-voltage battery is, for example, a battery for driving a vehicle mounted on the electric vehicle or the hybrid vehicle.

When the first power supply 10 is mounted on the engine vehicle, an alternator (generator) is provided instead of the DC/DC 11. The DC/DC 11 charges the PbB 12, supplies electric power to the first load 101 and the general load 102, supplies electric power to the second load 103, and charges the second power supply 20, which will be described later.

The power supply control apparatus 1 includes the second power supply 20, an inter-system switch 41, a battery switch 42, a switch driving unit 3, a first voltage sensor 51, and a second voltage sensor 52. The second power supply 20 is a backup power supply for a case where the electric power cannot be supplied by the first power supply 10. The second power supply 20 includes a lithium ion battery (hereinafter, referred to as a "LiB 21"). A battery of the second power supply 20 may be any secondary battery other than the LiB 21.

The inter-system switch 41 is a switch provided in an inter-system line 130 that connects the first system 110 to the second system 120, and capable of connecting and disconnecting the first system 110 to/from the second system 120. The battery switch 42 is a switch that connects the second power supply 20 to the second system 120.

The first voltage sensor 51 is provided in the first system 110, detects a voltage of the first system 110, and outputs a detection result to the switch driving unit 3. The second voltage sensor 52 is provided in the second system 120, detects a voltage of the second system 120, and outputs a detection result to the switch driving unit 3.

The switch driving unit 3 includes a microcomputer having a central processing unit (CPU), a read only memory (ROM), a random access memory (RAM), and the like, and various circuits. The switch driving unit 3 may be configured with hardware such as an application specific integrated circuit (ASIC) or a field programmable gate array (FPGA).

The switch driving unit 3 includes a primary ground fault detection unit 31, a secondary ground fault detection unit 32, and a mask processing unit 33, which function by the CPU executing a program stored in the ROM using the RAM as a work area, and controls the operation of the power supply control apparatus 1. The primary ground fault detection unit 31 may be functioned by the CPU of the microcomputer as mentioned above, but as an example of another embodiment, the primary ground fault detection unit 31 may be provided as a hardware circuit including a comparator to detect a voltage reduction and a one-shot multivibrator to output a signal of a one-shot pulse of, for example, 50 ms. A specific configuration example of the switch driving unit 3 will be described later with reference to FIG. 6. When the power supply control apparatus 1 is activated, the switch driving unit 3 connects (turns on) the inter-system switch 41 and cuts off (turns off) the battery switch 42.

The switch driving unit 3 detects a ground fault of the first system 110 or the second system 120 based on the detection results input from the first voltage sensor 51 and the second voltage sensor 52. A specific example of a method for detecting the ground fault by the switch driving unit 3 will be described later.

When the ground fault of the first system 110 or the second system 120 is detected, the switch driving unit 3 notifies the automated driving control device 100 of the fact. When the ground fault of the first system 110 or the second system 120 is detected, the switch driving unit 3 outputs, to the automated driving control device 100, an automated driving prohibition signal indicating that automated driving is impossible. When the ground fault of the first system 110 or the second system 120 is not detected, the switch driving unit 3 outputs, to the automated driving control device 100, an automated driving permission signal indicating that the automated driving is possible.

When the power supply failure such as a ground fault occurs in the first system 110, the switch driving unit 3 cuts off the inter-system switch 41, connects the battery switch 42, and supplies electric power from the second power supply 20 to the second load 103. When the power supply failure such as a ground fault occurs in the second system 120, the switch driving unit 3 supplies electric power from the first power supply 10 to the first load 101 and the general load 102 in a state where the inter-system switch 41 is cut off and the battery switch 42 is cut off.

Accordingly, even if one of the systems has a ground fault during the automated driving, the power supply control apparatus 1 can use the other system, perform the FOP for causing the vehicle to perform retreat traveling to a safe place by the automated driving control device 100, and stop the vehicle. Next, operations of the power supply control apparatus 1 will be described with reference to FIGS. 2 to 5.

[2. Normal Operation of Power Supply Control Apparatus]

Figure 2:
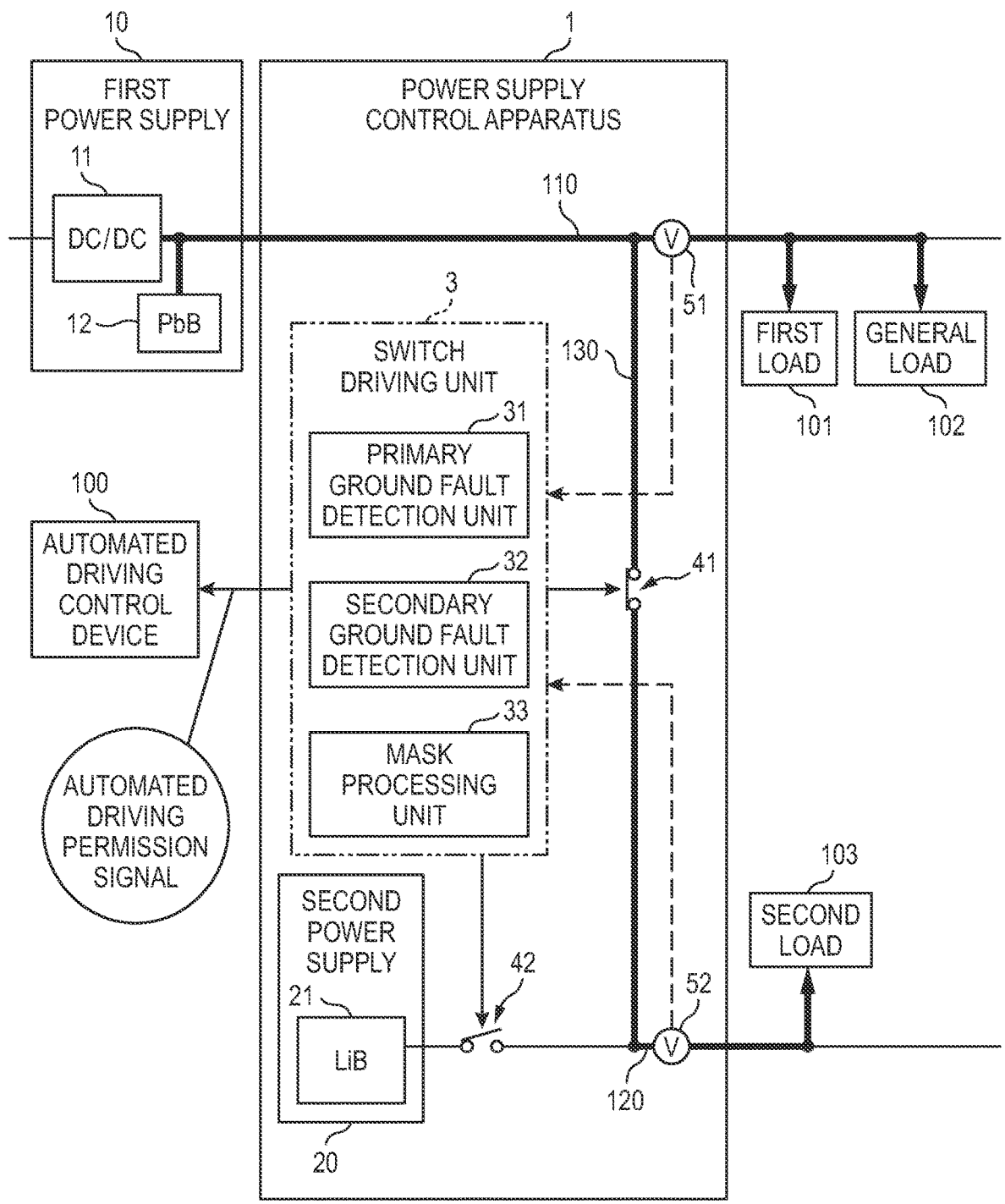
FIG. 2 is an illustrative diagram illustrating an operation example of the power supply control apparatus according to the embodiment.

In normal operation in which no ground fault occurs in the first system 110 and the second system 120, as illustrated in FIG. 2, the switch driving unit 3 cuts off the battery switch 42, connects the inter-system switch 41, and supplies the electric power from the first power supply 10 to the first load 101, the general load 102, and the second load 103. The switch driving unit 3 outputs the automated driving permission signal to the automated driving control device 100 in the normal operation in which no ground fault occurs as described above.

[3. Operation of Power Supply Control Apparatus when Ground Fault Occurs]

Figure 3:
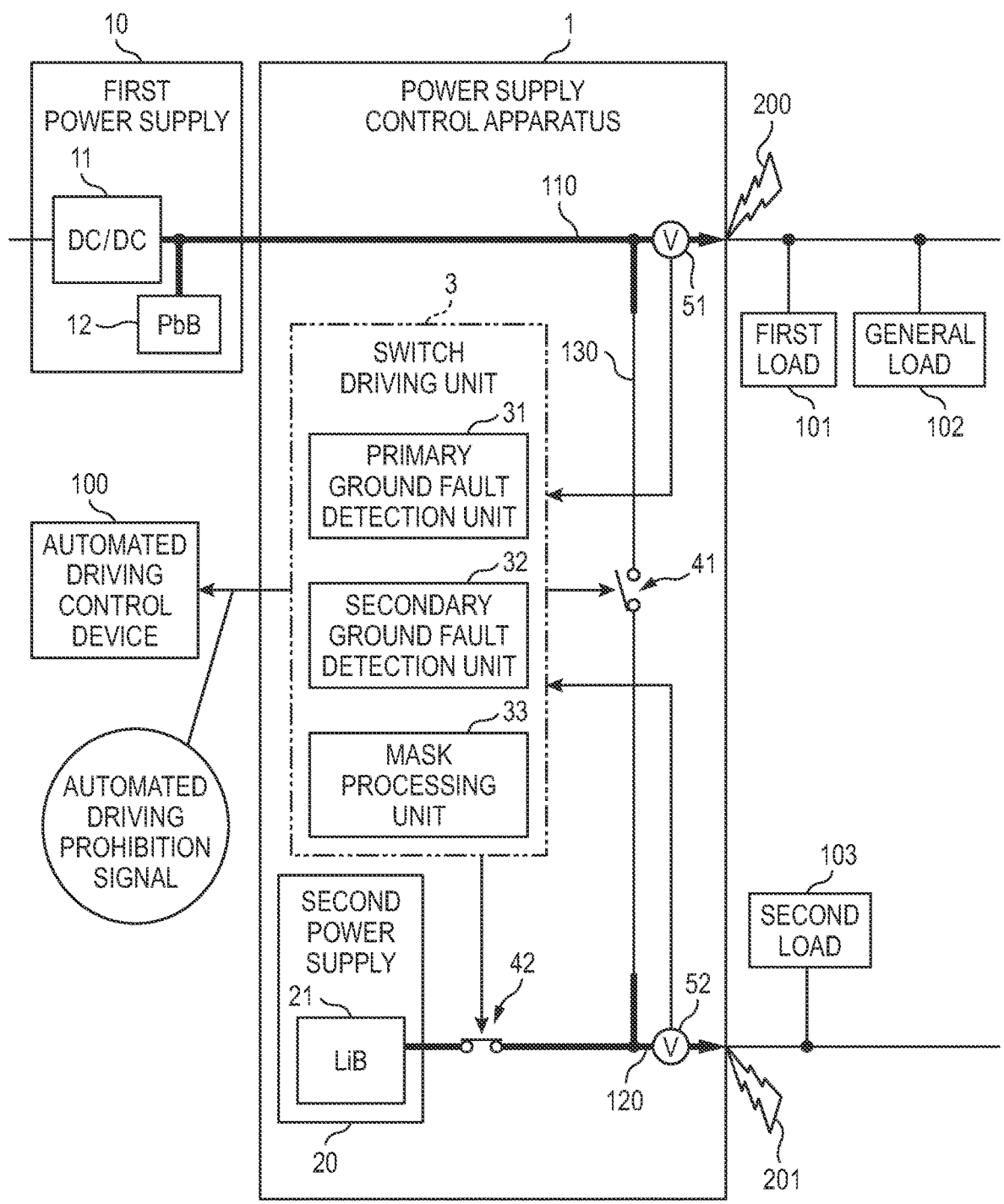
FIG. 3 is an illustrative diagram illustrating an operation example of the power supply control apparatus according to the embodiment.

Next, an operation of the power supply control apparatus 1 when a ground fault occurs will be described with reference to FIGS. 3 to 5. As illustrated in FIG. 3, in the power supply control apparatus 1, for example, when a ground fault 200 occurs in the first system 110 or a ground fault 201 occurs in the second system 120, an overcurrent flows toward a ground fault point, and thus the voltages detected by the first voltage sensor 51 and the second voltage sensor 52 become equal to or less than a ground fault determination threshold.

Therefore, for example, when the voltage detected by the second voltage sensor 52 becomes equal to or less than the ground fault determination threshold, the switch driving unit 3 temporarily determines that the ground fault 200 or 201 occurs in the first system 110 or the second system 120, and outputs the automated driving prohibition signal to the automated driving control device 100. When the switch driving unit 3 temporarily determines that the ground fault 200 or 201 occurs, the switch driving unit 3 cuts off the inter-system switch 41 and connects the battery switch 42. Accordingly, the first system 110 and the second system 120 are disconnected, electric power is supplied from the first power supply 10 to the first system 110, and electric power is supplied from the second power supply 20 to the second system 120.

When the voltage detected by at least one of the first voltage sensor 51 and the second voltage sensor 52 becomes equal to or less than the ground fault determination threshold, the switch driving unit 3 can also temporarily determine that the ground fault occurs in the first system 110 or the second system 120.

Thereafter, when the voltage detected by the first voltage sensor 51 is equal to or less than the ground fault determination threshold for a predetermined time or more and the voltage detected by the second voltage sensor 52 returns to a value exceeding the ground fault determination threshold within the predetermined time, the switch driving unit 3 determines that the ground fault 200 occurs in the first system 110.

Figure 4:
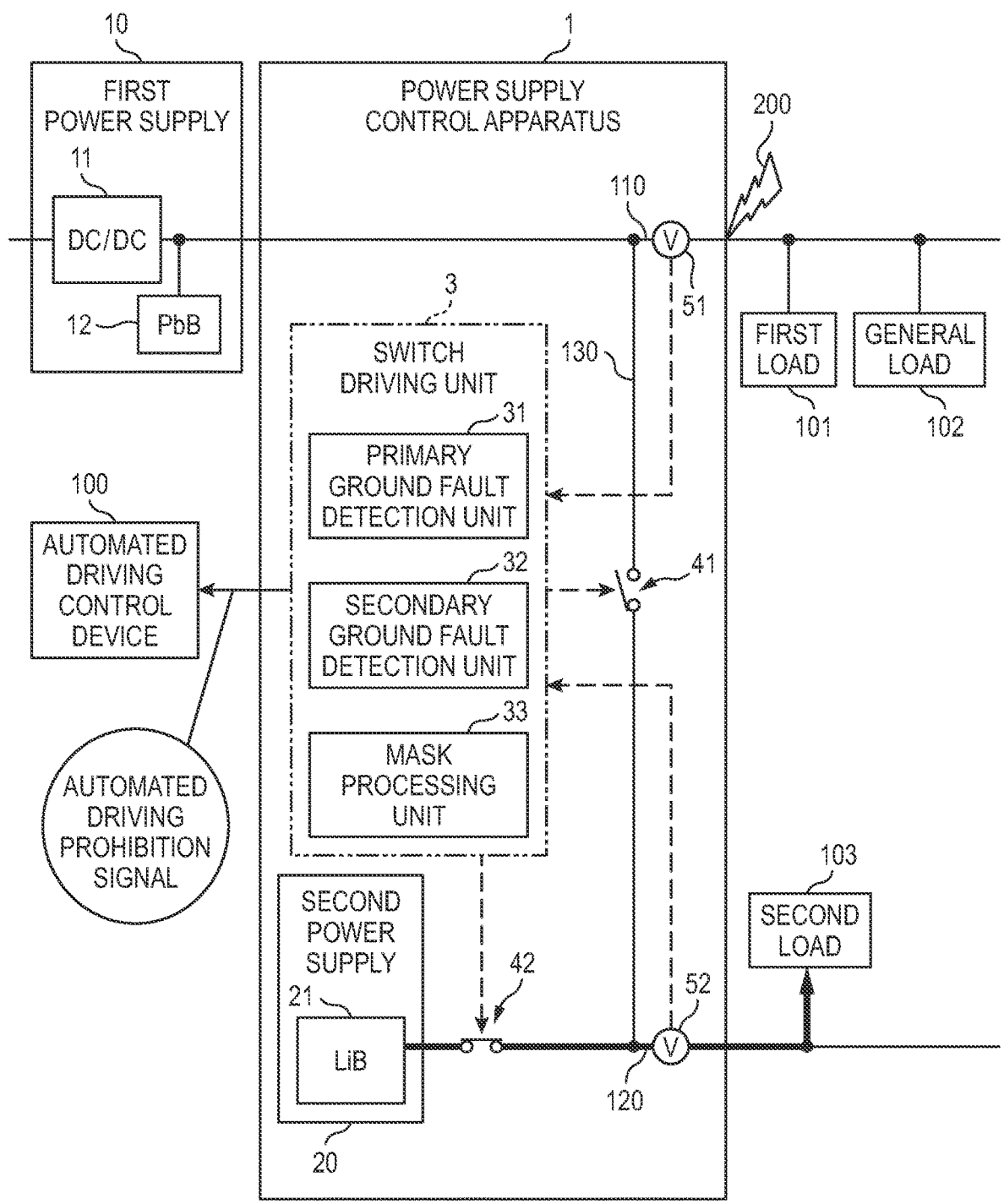
FIG. 4 is an illustrative diagram illustrating an operation example of the power supply control apparatus according to the embodiment.

In this case, as illustrated in FIG. 4, the switch driving unit 3 continues the cutoff of the inter-system switch 41 and the connection of the battery switch 42 to supply electric power from the second power supply 20 to the second load 103, and notifies the automated driving control device 100 of the fact. Accordingly, the automated driving control device 100 can operate the second load 103 by the electric power supplied from the second electric power source 20 to cause the vehicle to perform retreat traveling to a safe place and stop the vehicle. The automated driving control device 100 may be configured to start the retreat traveling at a time point when the automated driving prohibition signal is input from the power supply control apparatus 1.

Further, after it is temporarily determined that the ground fault occurs in the first system 110 or the second system 120, when the voltage detected by the second voltage sensor 52 is equal to or less than the ground fault determination threshold even after a predetermined time elapses, and the voltage detected by the first voltage sensor 51 returns to a value exceeding the ground fault determination threshold within the predetermined time, the switch driving unit 3 determines that the ground fault 201 occurs in the second system 120.

Figure 5:
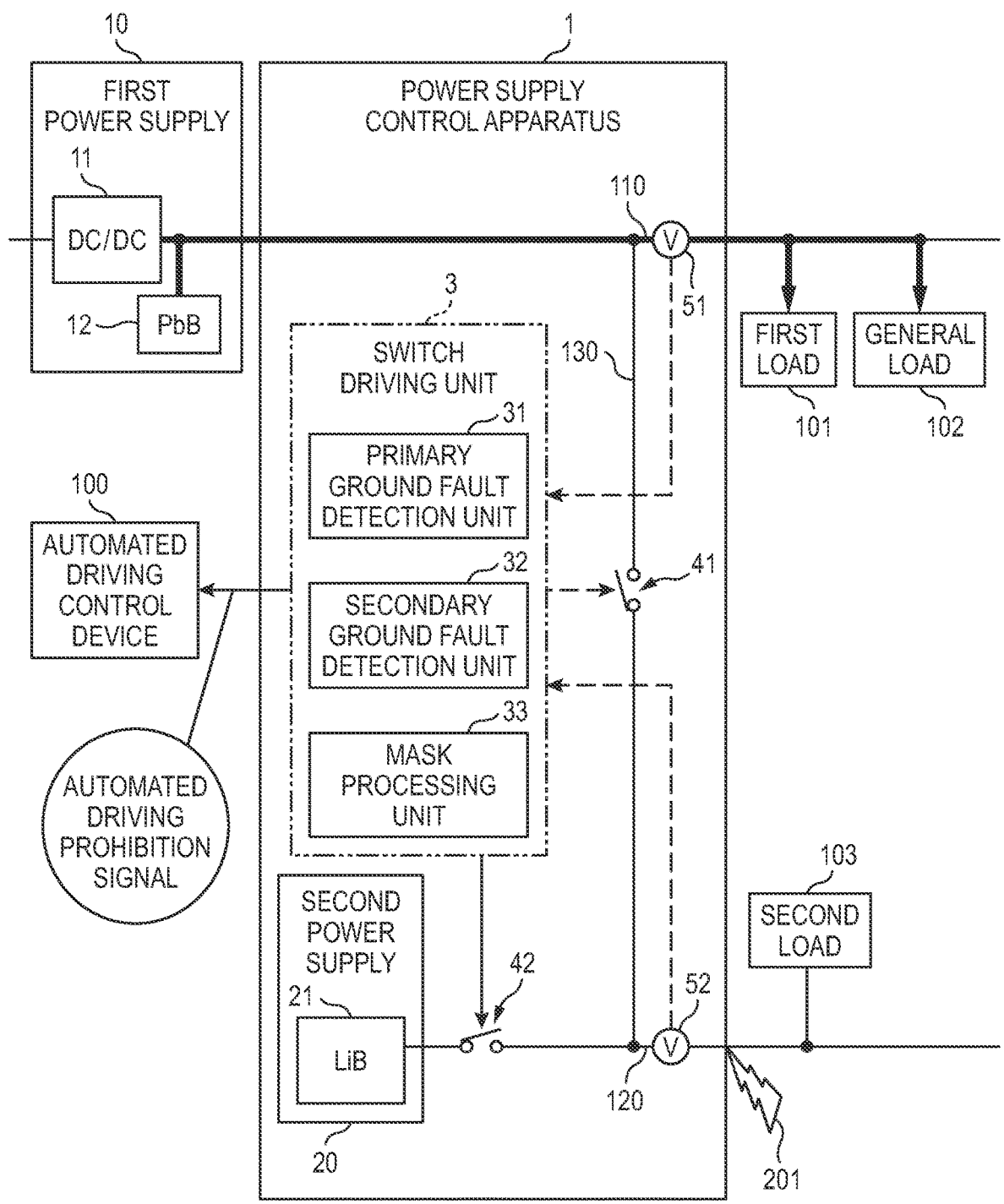
FIG. 5 is an illustrative diagram illustrating an operation example of the power supply control apparatus according to the embodiment.

In this case, as illustrated in FIG. 5, the switch driving unit 3 cuts off the battery switch 42 while continuing cutting off the inter-system switch 41, supplies electric power from the first power supply 10 to the first load 101, and notifies the automated driving control device 100 of the fact. Accordingly, the automated driving control device 100 can operate the first load 101 by the electric power supplied from the first electric power source 10 to cause the vehicle to perform retreat traveling to a safe place and stop the vehicle. The automated driving control device 100 may be configured to start the retreat traveling at a time point when the automated driving prohibition signal is input from the power supply control apparatus 1.

Further, in the power supply control apparatus 1, when the first load 101 or the general load 102 temporarily becomes an overload state instead of the ground fault 200 or 201, the voltage detected by the first voltage sensor 51 may temporarily become equal to or less than the ground fault determination threshold. In the power supply control apparatus 1, when the second load 103 temporarily becomes the overload state, the voltage detected by the second voltage sensor 52 may temporarily become equal to or less than the ground fault determination threshold.

In this case, in the power supply control apparatus 1, electric power is continuously supplied from the first power supply 10 to the first load 101 and the general load 102, and electric power is supplied from the second power supply 20 to the second load 103. Therefore, after it is temporarily determined that the ground fault 200 or 201 occurs in the first system 110 or the second system 120, if the voltages detected by the first voltage sensor 51 and the second voltage sensor 52 both return to values exceeding the ground fault determination threshold before predetermined time elapses, the switch driving unit 3 determines that there is no abnormality in the power supplies due to a transient voltage drop. Thereafter, in order to return the power supply control apparatus 1 to the normal operation illustrated in FIG. 2, the switch driving unit 3 cuts off the battery switch 42 and connects the inter-system switch 41 again.

[4. Configuration Example of Switch Driving Unit According to Embodiment]

Figure 6:
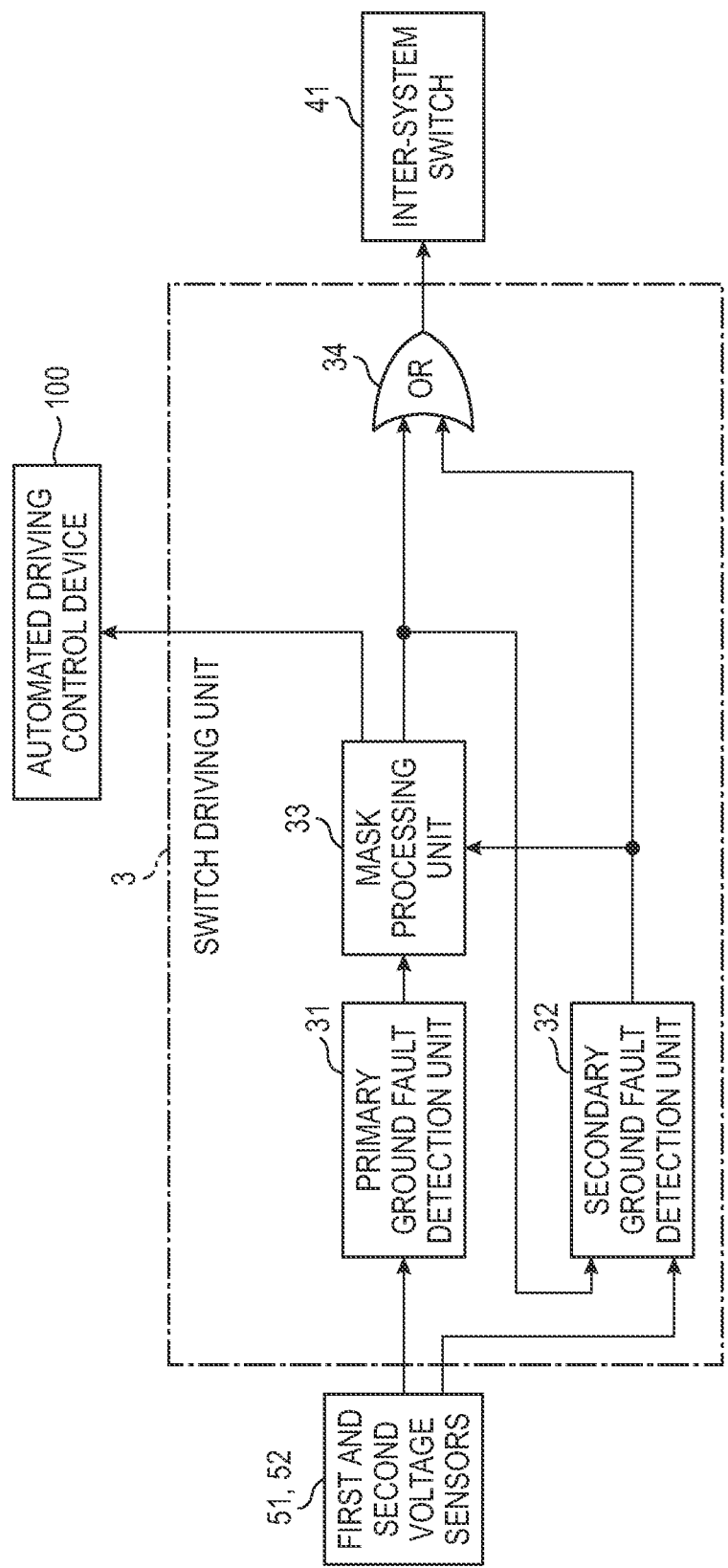
FIG. 6 is an illustrative diagram illustrating a configuration example of a switch driving unit according to the embodiment.

Next, a configuration example of the switch driving unit 3 according to the embodiment will be described with reference to FIG. 6. FIG. 6 is an illustrative diagram illustrating a configuration example of the switch driving unit 3 according to the embodiment. In FIG. 6, among components of the switch driving unit 3, components related to driving of the inter-system switch 41 are selectively illustrated.

As illustrated in FIG. 6, the switch driving unit 3 includes the primary ground fault detection unit 31, the secondary ground fault detection unit 32, the mask processing unit 33, and an OR logic circuit 34. The detection result of the voltage of the first system 110 is input from the first voltage sensor 51, and the detection result of the voltage of the second system 120 is input from the second voltage sensor 52 to the primary ground fault detection unit 31 and the secondary ground fault detection unit 32.

When a ground fault of the first system 110 or the second system 120 is detected, the primary ground fault detection unit 31 cuts off the inter-system switch 41. Specifically, when the voltage of the first system 110 or the voltage of the second system 120 becomes equal to or less than the ground fault determination threshold, the primary ground fault detection unit 31 outputs a primary ground fault detection signal to the OR logic circuit 34 and the secondary ground fault detection unit 32 via the mask processing unit 33. At this time, the primary ground fault detection unit 31 outputs, for example, a signal of a one-shot pulse of 50 ms. When the primary ground fault detection signal is input from the primary ground fault detection unit 31, the secondary ground fault detection unit 32 outputs a secondary ground fault detection signal to the OR logic circuit 34.

As described above, the mask processing unit 33 normally outputs the primary ground fault detection signal detected by the primary ground fault detection unit 31 to the OR logic circuit 34 and the secondary ground fault detection unit 32 without masking the primary ground fault detection signal. When the inter-system switch 41 is reconnected, the mask processing unit 33 sets a cutoff prohibition period, which will be described later, and during the cutoff prohibition period, the mask processing unit 33 prohibits the primary ground fault detection unit 31 from cutting off the inter-system switch by masking the primary ground fault detection signal output from the primary ground fault detection unit 31. Details of an operation of the mask processing unit 33 will be described later.

When the primary ground fault detection signal is input from the primary ground fault detection unit 31, the OR logic circuit 34 outputs the primary ground fault detection signal to the inter-system switch 41 to cut off the inter-system switch 41. Thereafter, when the secondary ground fault detection signal is input from the secondary ground fault detection unit 32, the OR logic circuit 34 outputs the secondary ground fault detection signal to the inter-system switch 41 to continue the cutoff of the inter-system switch 41. The secondary ground fault detection unit 32 determines a ground fault system based on the detection results of the first and second voltage sensors 51, 52. If the ground fault has been eliminated, a signal for reconnecting the inter-system switch 41 is output to the OR logic circuit 34.

When the ground fault is detected by the primary ground fault detection unit 31, the secondary ground fault detection unit 32 monitors a system where the ground fault continues for a predetermined period, and when the ground fault is eliminated, the secondary ground fault detection unit 32 reconnects the inter-system switch 41. Specifically, when the ground fault is detected by the primary ground fault detection unit 31, the secondary ground fault detection unit 32 samples the voltages of the first system 110 and the second system 120 at a predetermined cycle for the predetermined period.

Then, when the secondary ground fault detection unit 32 samples the voltage exceeding the ground fault determination threshold continuously for a predetermined time (for example, 40 ms) or more, the secondary ground fault detection unit 32 determines that the ground fault is not continued, and outputs a connection signal for reconnecting the inter-system switch 41 to the OR logic circuit 34. When the connection signal is input from the secondary ground fault detection unit 32, the OR logic circuit 34 outputs the connection signal to the inter-system switch 41 to reconnect the inter-system switch 41.

Here, when the voltage of the first power supply 10 is in the vicinity of the ground fault determination threshold due to aging degradation or failure of the first power supply 10, a decrease to a value less than the ground fault determination threshold and a return to a value equal to or larger than the ground fault determination threshold are repeated. Therefore, the connection and cutoff of the inter-system switch 41 are repeated, and durability of the inter-system switch 41 is reduced. Such a problem also occurs when the voltage of the second power supply 20 is in the vicinity of the ground fault determination threshold.

Therefore, the switch driving unit 3 includes the mask processing unit 33. When the inter-system switch 41 is reconnected, the mask processing unit 33 sets the cutoff prohibition period, and prohibits the primary ground fault detection unit 31 from cutting off the inter-system switch 41 during the cutoff prohibition period. For example, when a signal indicating that the inter-system switch 41 is reconnected is input from the secondary ground fault detection unit 32, the mask processing unit 33 performs mask processing of cutting off the output of the primary ground fault detection signal (one-shot pulse) from the primary ground fault detection unit 31 to the OR logic circuit 34 and the secondary ground fault detection unit 32 during the cutoff prohibition period.

Accordingly, the power supply control apparatus 1 does not cut off the inter-system switch 41 even if the ground fault is detected by the primary ground fault detection unit 31 immediately after the inter-system switch 41 is reconnected. Therefore, the power supply control apparatus 1 can suppress the decrease in the durability of the inter-system switch 41 due to the repeated connection and cutoff of the inter-system switch 41.

Further, when the ground fault is detected again by the primary ground fault detection unit 31 within a predetermined time (for example, within 1.5 seconds) after the reconnection of the inter-system switch 41, the mask processing unit 33 extends the cutoff prohibition period. Accordingly, the power supply control apparatus 1 can further improve the durability of the inter-system switch 41 by further reducing a repetition frequency of the connection and cutoff of the inter-system switch 41.

Further, when the cutoff prohibition period of the inter-system switch 41 is extended, the mask processing unit 33 outputs the automated driving prohibition signal for prohibiting automated driving during the same trip to the automated driving control device 100. Accordingly, it is possible to prevent a transition to automated driving in a situation where a voltage at which a ground fault is frequently detected by the primary ground fault detection unit 31 is unstable.

[5. Operation Timing of Power Supply Control Apparatus]

Figure 7:
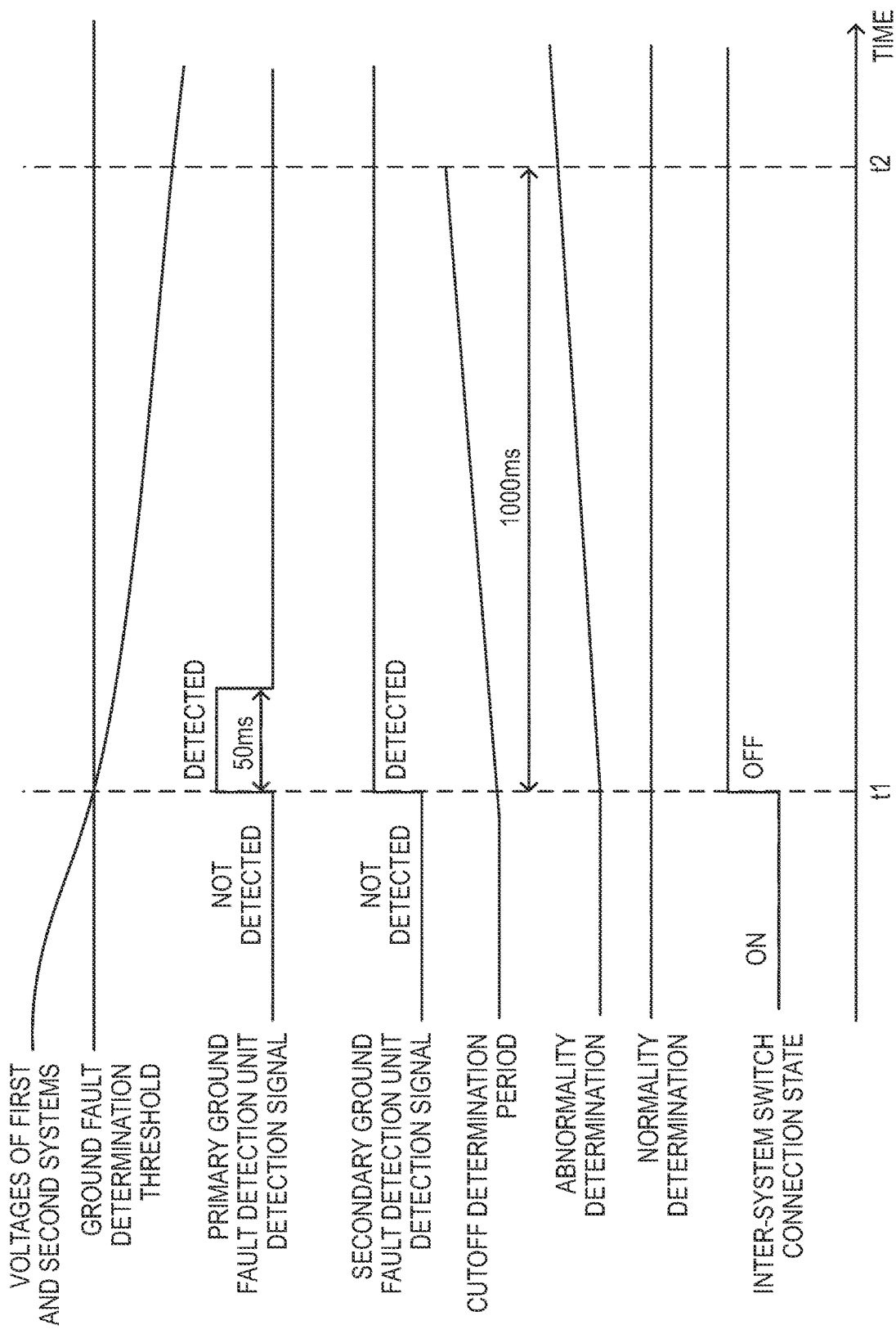
FIG. 7 is a timing chart illustrating operation timing of a power supply control apparatus according to a comparative example of the embodiment.
Figure 8:
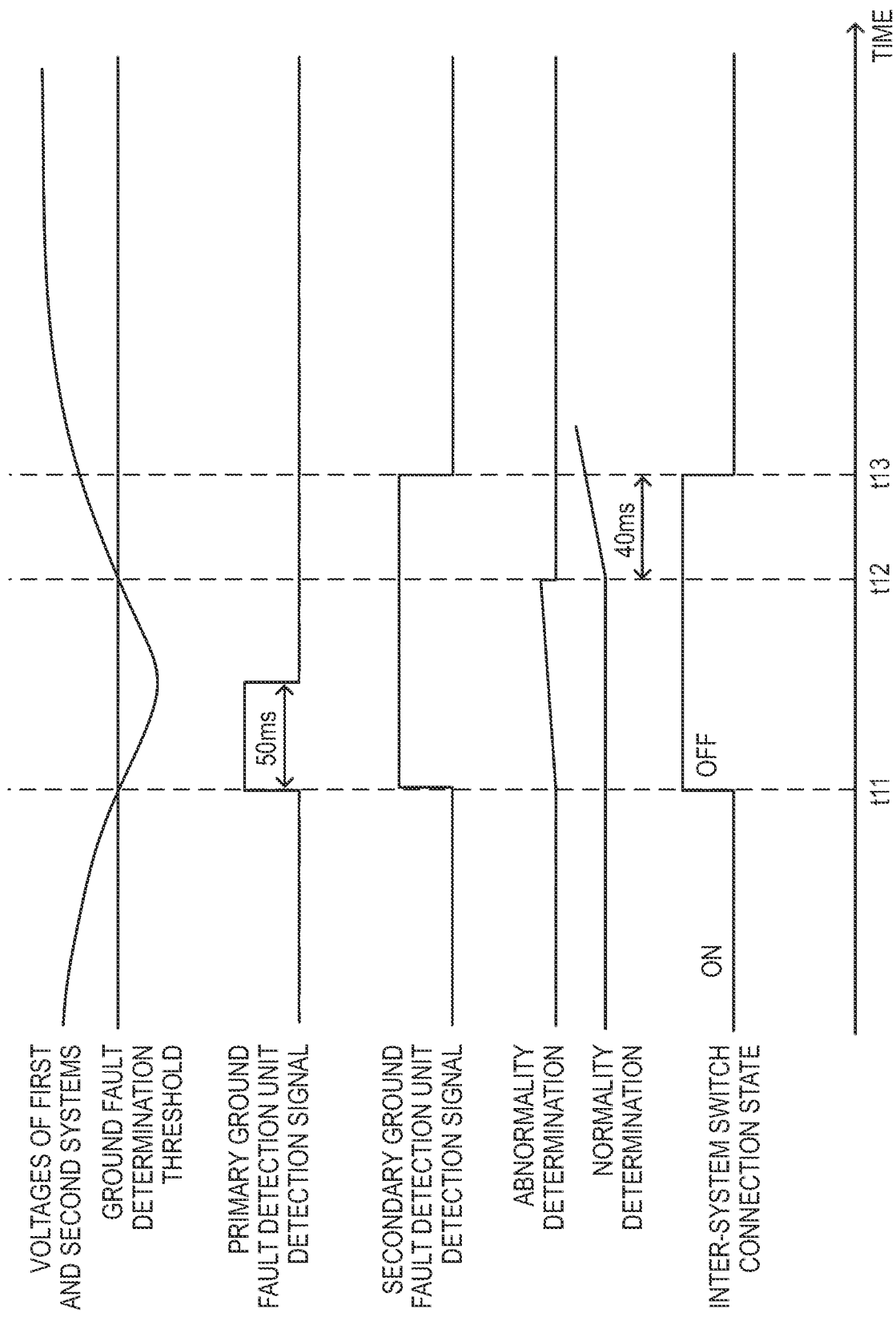
FIG. 8 is a timing chart illustrating operation timing of the power supply control apparatus according to the comparative example of the embodiment.
Figure 9:
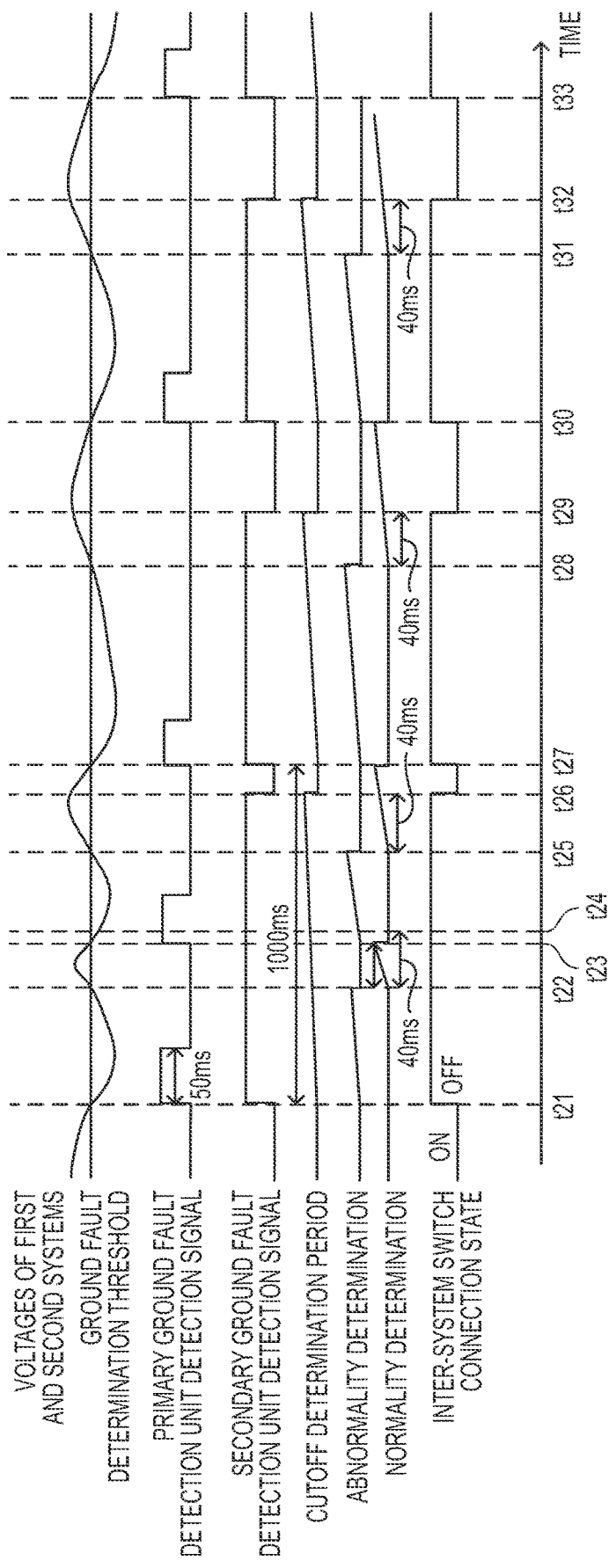
FIG. 9 is a timing chart illustrating operation timing of the power supply control apparatus according to the comparative example of the embodiment.
Figure 10:
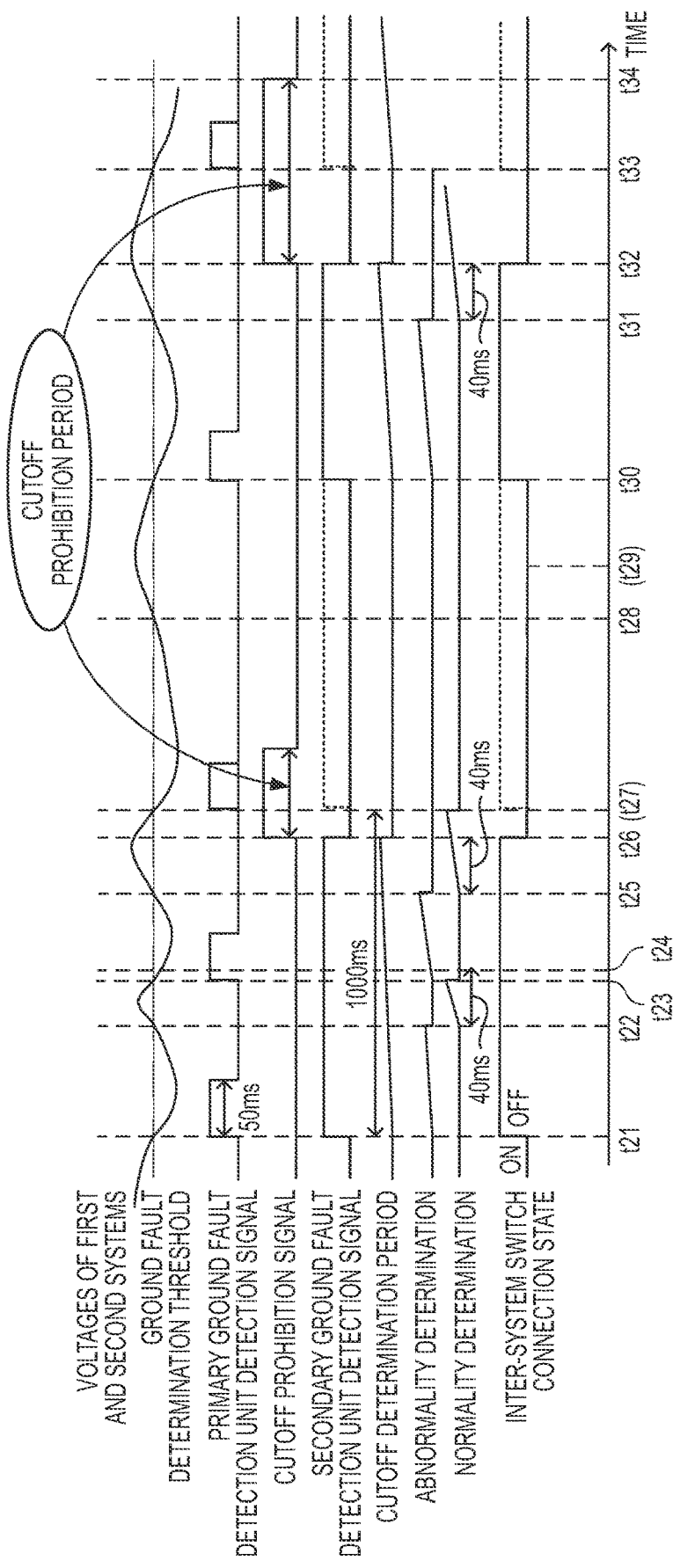
FIG. 10 is a timing chart illustrating operation timing of the power supply control apparatus according to the embodiment.

Next, operation timing of the power supply control apparatus will be described with reference to FIGS. 7 to 10. FIGS. 7 to 9 are timing charts each illustrating operation timing of the power supply control apparatus according to a comparative example of the embodiment. FIG. 10 is a timing chart illustrating operation timing of the power supply control apparatus 1 according to the embodiment.

The first and second system voltages illustrated in FIGS. 7 to 10 are voltages of the first system 110 and/or the second system 120. The ground fault determination threshold is a threshold of a voltage to be compared with the first and second system voltages. A primary ground fault detection unit detection signal is a primary ground fault detection signal that changes from Low to High at the timing when the primary ground fault detection unit 31 detects a ground fault.

A secondary ground fault detection unit detection signal is a signal that changes from Low to High when the primary ground fault detection signal output from the primary ground fault detection unit 31 is received, and continues to be High when the ground fault is confirmed by the secondary ground fault detection unit 32, or changes from High to Low when the secondary ground fault detection unit 32 determines that the ground fault is not continued. The signal that changes from High to Low serves as a connection signal for reconnecting the inter-system switch 41. A cutoff determination period is a counter value that is counted up while the secondary ground fault detection unit 32 determines whether the ground fault continues (for example, 1000 ms) after the ground fault is detected by the primary ground fault detection unit 31.

An abnormality determination is a counter value that is counted up while the secondary ground fault detection unit 32 determines that the first and second system voltages are equal to or less than the ground fault determination threshold, and that is reset when the first and second system voltages are equal to or larger than the ground fault determination threshold. A normality determination is a counter value that is counted up while the secondary ground fault detection unit 32 determines that the first and second system voltages exceed the ground fault determination threshold, and that is reset when the first and second system voltages become equal to or less than the ground fault determination threshold.

An inter-system switch connection state changes from Low to High at a timing at which the inter-system switch 41 switches from connection to disconnection, and changes from High to Low at a timing at which the inter-system switch 41 switches from disconnection to connection. The cutoff prohibition signal illustrated in FIG. 10 is a signal output by the mask processing unit 33 according to the embodiment to prohibit the cutoff of the inter-system switch 41. The primary ground fault detection unit 31 according to a comparative example prohibits the cutoff of the inter-system switch 41 during a period in which the cutoff prohibition signal is High.

As illustrated in FIG. 7, when the first and second system voltages become equal to or less than the ground fault determination threshold at a time t1, the primary ground fault detection unit 31 according to the comparative example outputs the primary ground fault detection signal (one-shot pulse) to the OR logic circuit 34 and the secondary ground fault detection unit 32. Accordingly, the inter-system switch 41 is cut off at the time t1 by the primary ground fault detection signal via the OR logic circuit 34. When the primary ground fault detection signal is detected, the secondary ground fault detection unit 32 temporarily determines that a ground fault occurs, and outputs a secondary ground fault detection signal to the OR logic circuit 34 at a timing slightly later than the time t1. Accordingly, the inter-system switch 41 is maintained in a cutoff state.

After the time t1, since the first and second system voltages are continuously equal to or less than the ground fault determination threshold, a count value of the abnormality determination increases. The secondary ground fault detection unit 32 determines that a ground fault occurs at a time t2 at which 1000 ms of the cutoff determination period elapses from the time t1 while the count value of the abnormality determination continuously increases.

As illustrated in FIG. 8, the primary ground fault detection unit 31 according to the comparative example outputs a one-shot pulse when the first and second system voltages become equal to or less than the ground fault determination threshold at a time t11. Accordingly, as in the example illustrated in FIG. 7, the inter-system switch 41 is cut off at the time W.

Thereafter, the counter value of the abnormality determination increases until a time t12 at which the first and second system voltages exceed the ground fault determination threshold. When the first and second system voltages exceed the ground fault determination threshold, the count value of the abnormality determination is reset, and the count value of the normality determination increases.

When the increase in the count value of the normality determination continues for a predetermined time (40 ms) within the cutoff determination period, the secondary ground fault detection unit 32 determines that no ground fault occurs at a time t13. Accordingly, the inter-system switch 41 is reconnected at the time t13.

As illustrated in FIG. 9, the first and second system voltages may repeatedly fluctuate in the vicinity of the ground fault determination threshold. In this case, a switch driving unit according to the comparative example may frequently cut off and reconnect the inter-system switch 41.

For example, as illustrated in FIG. 9, the switch driving unit according to the comparative example cuts off the inter-system switch 41 when the first and second system voltages become equal to or less than the ground fault determination threshold at a time t21. Thereafter, although the first and second system voltages exceed the ground fault determination threshold during a period from a time t22 to a time t23, since the increase in the count value of the normality determination ends in a time shorter than 40 ms (at the time t23), the switch driving unit according to the comparative example does not reconnect the inter-system switch 41 here. During a period from the time t23 to a time t25, the first and second system voltages become equal to or less than the ground fault determination threshold, but the inter-system switch 41 maintains the cutoff state.

Thereafter, since the first and second system voltages continuously exceed the ground fault determination threshold during 40 ms from the time t25 to a time t26, the switch driving unit according to the comparative example reconnects the inter-system switch 41 at the time t26, and when the first and second system voltages become equal to or less than the ground fault determination threshold at a time t27, the switch driving unit cuts off the inter-system switch 41 again.

Thereafter, since the first and second system voltages continuously exceed the ground fault determination threshold during 40 ms from a time t28 to a time t29, the switch driving unit according to the comparative example reconnects the inter-system switch 41 at the time t29, and when the first and second system voltages become equal to or less than the ground fault determination threshold at a time t30, the switch driving unit cuts off the inter-system switch 41 for a third time.

Thereafter, since the first and second system voltages continuously exceed the ground fault determination threshold during 40 ms from a time t31 to a time t32, the switch driving unit according to the comparative example reconnects the inter-system switch 41 at the time t32, and when the first and second system voltages become equal to or less than the ground fault determination threshold at a time t33, the switch driving unit cuts off the inter-system switch 41 for a fourth time. As described above, the switch driving unit according to the comparative example may frequently cut off and reconnect the inter-system switch 41.

In contrast, since the switch driving unit 3 according to the embodiment drives and controls the inter-system switch 41 as illustrated in FIG. 10, the number of times of connection and the number of times of cutoff of the inter-system switch 41 can be reduced as compared with the switch driving unit according to the comparative example.

Waveforms of the first and second system voltages illustrated in FIG. 10 are the same as waveforms of the first and second system voltages illustrated in FIG. 9. As illustrated in FIG. 10, the switch driving unit 3 according to the embodiment performs the same drive control as that of the switch driving unit according to the comparative example from the time t21 to the time t26, but when the inter-system switch 41 is reconnected at the time t26, the mask processing unit 33 sets the setoff prohibition period of the inter-system switch 41.

Accordingly, even if a ground fault is detected by the primary ground fault detection unit 31 at the time t27 immediately after the inter-system switch 41 is reconnected at the time t26, the primary ground fault detection signal is masked by the mask processing unit 33, and the switch driving unit 3 does not cut off the inter-system switch 41.

Thereafter, during a period from the time t27 to the time t28, the first and second system voltages are equal to or less than the ground fault determination threshold, but the first and second system voltages do not change from a value exceeding the ground fault determination threshold to a value equal to or less than the ground fault determination threshold, and thus the count value of the abnormality determination does not increase. During this period, since the inter-system switch 41 maintains the connected (ON) state, the count value of the normality determination also does not increase.

Therefore, the inter-system switch 41 is connected at the time t29 in the switch driving unit according to the comparative example, whereas the switch driving unit 3 according to the embodiment does not perform the switching operation. Thereafter, when the first and second system voltages become equal to or less than the ground fault determination threshold at the time t30, the switch driving unit 3 cuts off the inter-system switch 41.

Thereafter, when the time during which the first and second system voltages become equal to or greater than the ground fault determination threshold reaches a predetermined time (from a time t31 to a time t32), the switch driving unit 3 sets the setoff prohibition period of the inter-system switch 41 again at the time t32. The cutoff prohibition signal is generated (switched from Low to High) when the inter-system switch 41 is reconnected (the time t32). However, the mask processing unit 33 starts the mask processing before the inter-system switch 41 is reconnected. This is because voltage fluctuation may occur when the inter-system switch 41 is reconnected, and the fluctuation prevents the primary ground fault detection signal from passing through the mask processing unit 33.

Further, when the ground fault is detected again by the primary ground fault detection unit 31 within a predetermined time (for example, the time t30) after the previous reconnection of the inter-system switch 41, the switch driving unit 3 extends the cutoff prohibition period (from the time t32 to a time t34). "After reconnection of the inter-system switch 41", which is a condition for extending the cutoff prohibition period, is a concept including "after setting of the cutoff prohibition period" and "after elapse of the cutoff prohibition period". This is because there is a one-to-one correspondence between the reconnection of the inter-system switch 41 and the setting of the cutoff prohibition period.

Accordingly, the switch driving unit according to the comparative example cuts off the inter-system switch 41 at the time t33, whereas the switch driving unit 3 according to the embodiment does not perform the switching operation. As described above, when the inter-system switch 41 is reconnected, the switch driving unit 3 according to the embodiment can reduce the number of times of connection and the number of times of cutoff of the inter-system switch 41 by setting the cutoff prohibition period of the inter-system switch 41 as compared with the switch driving unit according to the comparative example.

[6. Processing Executed by Switch Driving Unit]

Figure 11:
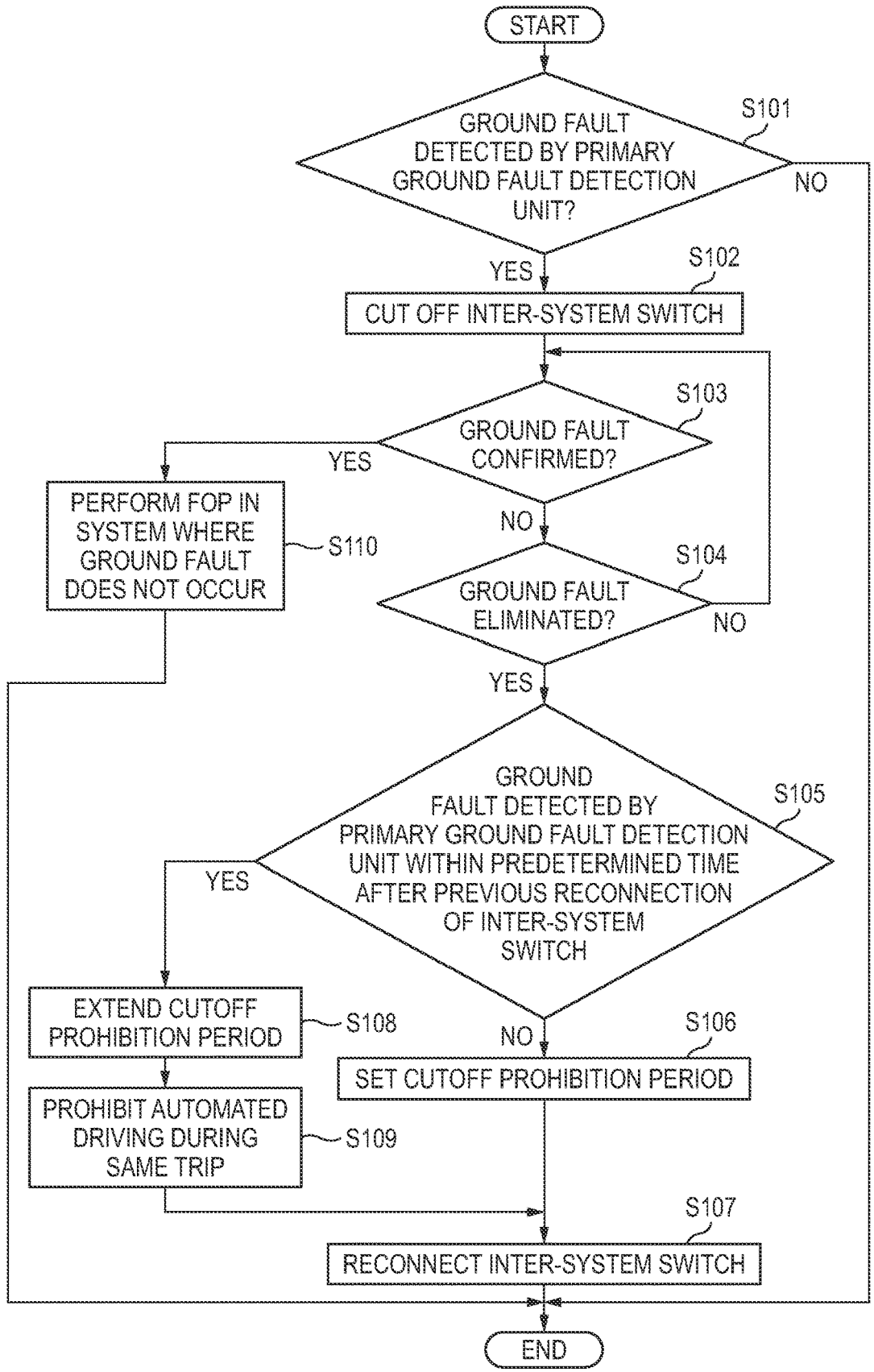
FIG. 11 is a flowchart illustrating an example of processing executed by the switch driving unit according to the embodiment.

Next, processing executed by the switch driving unit 3 of the power supply control apparatus 1 will be described with reference to FIG. 11. FIG. 11 is a flowchart illustrating an example of processing executed by the switch driving unit 3 of the power supply control apparatus 1 according to the embodiment.

The switch driving unit 3 determines whether a ground fault is detected by the primary ground fault detection unit 31 during the normal operation (step S101). When it is determined that the ground fault is not detected (step S101: No), the switch driving unit 3 ends the processing and starts the processing from step S101 again.

When it is determined that the ground fault is detected (step S101: Yes), the switch driving unit 3 cuts off the inter-system switch 41 (step S102), and determines whether the ground fault is confirmed as a monitoring result performed by the secondary ground fault detection unit 32 (step S103). When it is determined that the ground fault is confirmed (step S103: Yes), the switch driving unit 3 performs the FOP in a system where the ground fault does not occur (step S110), and ends the processing.

When it is determined that the ground fault is not confirmed (step S103: No), the switch driving unit 3 determines whether the ground fault is eliminated (step S104). When the switch driving unit 3 determines that the ground fault is not eliminated (step S104: No), the processing proceeds to step S103. When it is determined that the ground fault is eliminated (step S104: Yes), the switch driving unit 3 determines whether the current ground fault is detected by the primary ground fault detection unit 31 within the predetermined time after the previous reconnection of the inter-system switch 41 (step S105).

When it is determined that the ground fault is not detected within the predetermined time (step S105: No), the switch driving unit 3 sets the cutoff prohibition period of the inter-system switch 41 (step S106), reconnects the inter-system switch 41 (step S107), and ends the processing. That is, when the ground fault is detected in step S101 and it is determined in step S104 that the ground fault is eliminated for the first time during the current trip (a period in which an ignition switch is turned on this time) or when the ground fault is detected again within the predetermined time after the elapse of the previous cutoff prohibition period, the cutoff prohibition period which is a standard value is set.

When it is determined that the ground fault is detected within the predetermined time (step S105: Yes), the switch driving unit 3 extends the cutoff prohibition period (step S108) and prohibits the automated driving during the same trip (step S109), and the processing proceeds to step S107.

[7. Configuration Example of Switch Driving Unit According to Modification]

Figure 12:
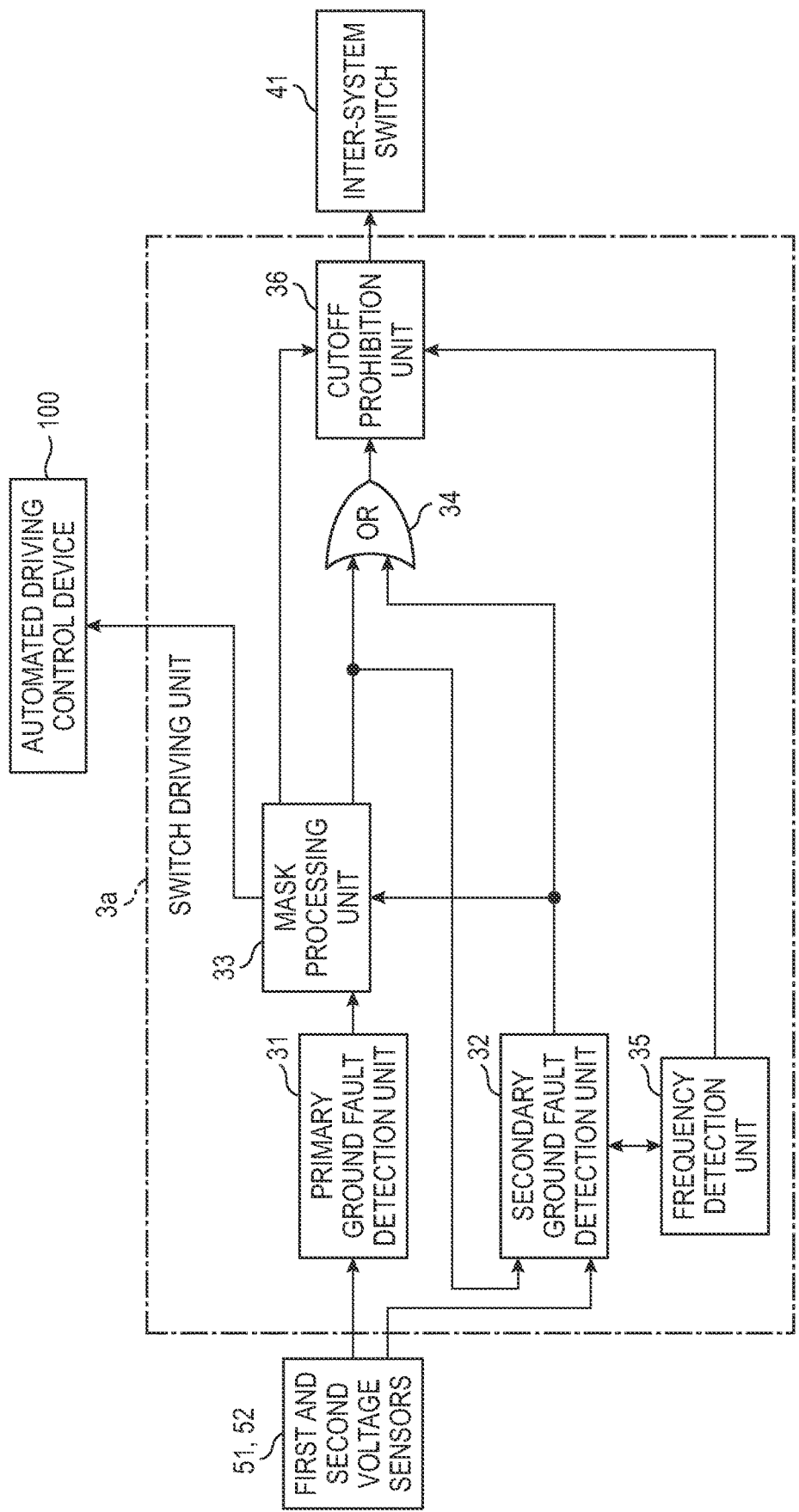
FIG. 12 is an illustrative diagram illustrating a configuration example of a switch driving unit according to a modification of the embodiment.

Next, a configuration example of a switch driving unit 3a according to a modification of the embodiment will be described with reference to FIG. 12. FIG. 12 is an illustrative diagram illustrating the configuration example of the switch driving unit 3a according to the modification of the embodiment. In FIG. 12, among components of the switch driving unit 3a, components related to driving of the inter-system switch 41 are selectively illustrated.

As illustrated in FIG. 12, the switch driving unit 3a further includes a frequency detection unit 35 and a cutoff prohibition unit 36 in addition to the components provided in the switch driving unit 3 illustrated in FIG. 6. The frequency detection unit 35 detects frequency of cutoff of the inter-system switch 41 by the primary ground fault detection unit 31 and reconnection of the inter-system switch 41 by the secondary ground fault detection unit 32.

When the primary ground fault detection signal is output from the primary ground fault detection unit 31 to the secondary ground fault detection unit 32, the frequency detection unit 35 acquires the cutoff timing of the inter-system switch 41 by the primary ground fault detection unit 31 based on the secondary ground fault detection signal input from the secondary ground fault detection unit 32.

When the secondary ground fault detection unit 32 determines that the ground fault does not continue, the frequency detection unit 35 acquires a reconnection timing of the inter-system switch 41 by the secondary ground fault detection unit 32 based on the input of the connection signal from the secondary ground fault detection unit 32.

The frequency detection unit 35 detects the frequency of the cutoff and the reconnection of the inter-system switch 41 from the acquired cutoff timing of the inter-system switch 41 by the primary ground fault detection unit 31 and the acquired reconnection timing of the inter-system switch 41 by the secondary ground fault detection unit 32. For example, when the cutoff and the reconnection of the inter-system switch 41 are performed once, the frequency detection unit 35 can set the number of times of cutoff-reconnection in a predetermined period (for example, three minutes) as the frequency.

Then, the frequency detection unit 35 outputs information on the detected frequency to the cutoff prohibition unit 36. The frequency detection unit 35 also outputs the detected frequency to the mask processing unit 33 via the secondary ground fault detection unit 32. The frequency detection unit 35 may detect only the cutoff frequency of the inter-system switch 41 as the frequency, or may detect only the reconnection frequency of the inter-system switch 41 as the frequency. Further, the frequency detection unit 35 may detect, as the frequency, a short time from the cutoff to the reconnection of the inter-system switch 41 or a short time from the reconnection to the re-cutoff.

The cutoff prohibition unit 36 prohibits the cutoff of the inter-system switch 41 when the frequency of the cutoff and reconnection of the inter-system switch 41 is equal to or higher than a predetermined frequency. Accordingly, a power supply control apparatus 1a can suppress the decrease in the durability of the inter-system switch 41 by suppressing repetition of the frequent cutoff and reconnection of the inter-system switch 41.

When the inter-system switch 41 is reconnected by the secondary ground fault detection unit 32, the mask processing unit 33 sets the cutoff prohibition period in which the cutoff prohibition unit 36 prohibits the cutoff of the inter-system switch 41. Accordingly, the power supply control apparatus 1a can suppress the decrease in the durability of the inter-system switch 41 due to the repeated connection and cutoff of the inter-system switch 41.

When the frequency detected by the frequency detection unit 35 is equal to or higher than a predetermined frequency, the mask processing unit 33 extends the cutoff prohibition period of the inter-system switch 41. Accordingly, the power supply control apparatus 1a can further improve the durability of the inter-system switch 41 by further reducing the repetition frequency of the connection and cutoff of the inter-system switch 41.

When the frequency detected by the frequency detection unit 35 is equal to or higher than a predetermined frequency, the cutoff prohibition unit 36 prohibits the cutoff of the inter-system switch 41 during the same trip. Accordingly, the power supply control apparatus 1a can prevent the behavior of the vehicle from becoming unstable during the same trip due to the repetition of the cutoff and reconnection of the inter-system switch 41.

[8. Processing Executed by Switch Driving Unit According to Modification]

Figure 13:
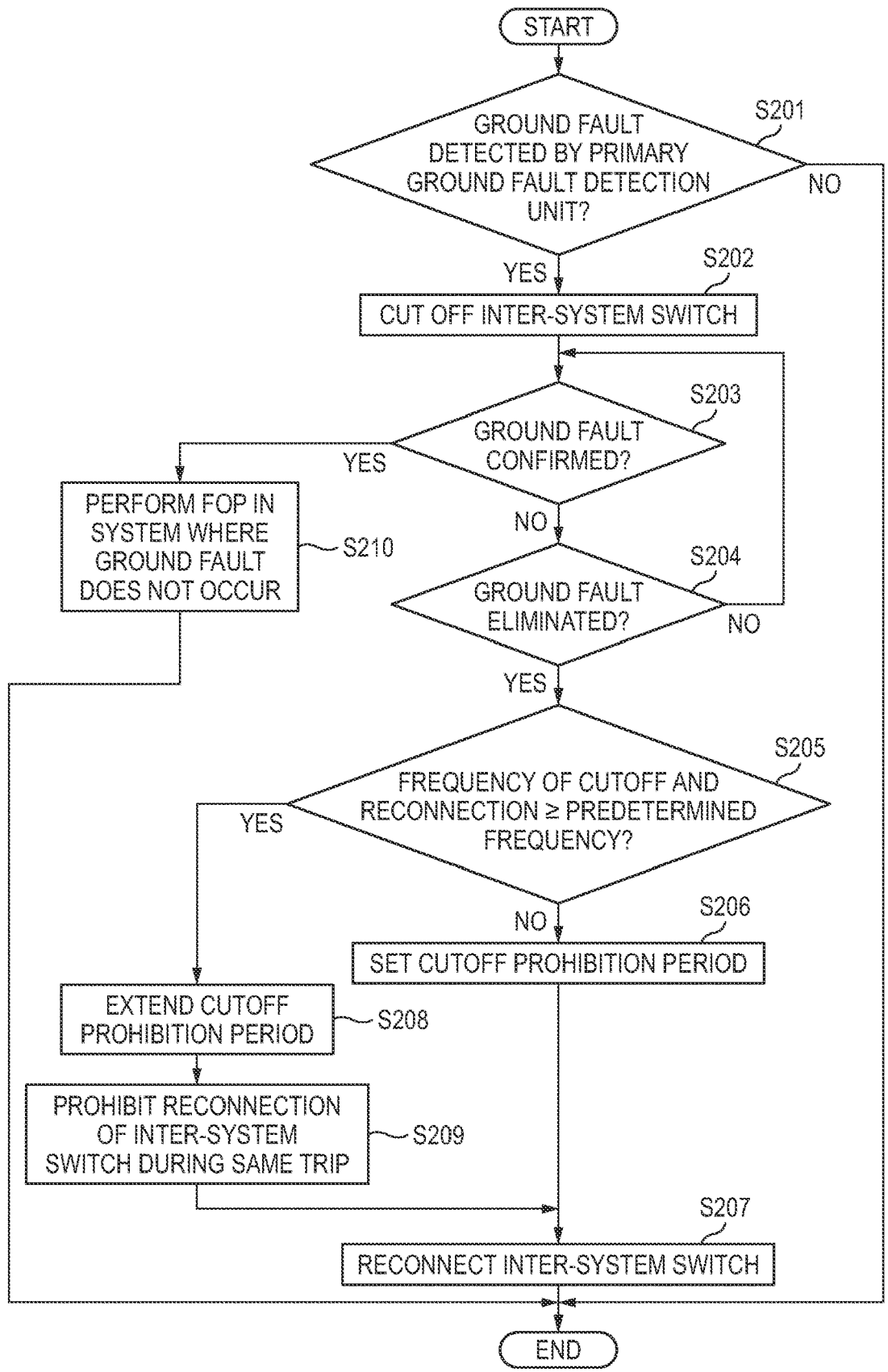
FIG. 13 is a flowchart illustrating an example of processing executed by the switch driving unit according to the modification of the embodiment.

Next, processing executed by the switch driving unit 3a according to the modification of the embodiment will be described with reference to FIG. 13. FIG. 13 is a flowchart illustrating an example of the processing executed by the switch driving unit 3a according to the modification of the embodiment.

The switch driving unit 3a determines whether a ground fault is detected by the primary ground fault detection unit 31 during the normal operation (step S201). When it is determined that the ground fault is not detected (step S201: No), the switch driving unit 3a ends the processing and starts the processing from step S201 again.

When it is determined that the ground fault is detected (step S201: Yes), the switch driving unit 3a cuts off the inter-system switch 41 (step S202), and determines whether the ground fault is confirmed as a monitoring result performed by the secondary ground fault detection unit 32 (step S203). When it is determined that the ground fault is confirmed (step S203: Yes), the switch driving unit 3a performs the FOP in a system where the ground fault does not occur (step S210), and ends the processing.

When it is determined that the ground fault is not confirmed (step S203: No), the switch driving unit 3a determines whether the ground fault is eliminated (step S204). When the switch driving unit 3a determines that the ground fault is not eliminated (step S204: No), the processing proceeds to step S203.

When it is determined that the ground fault is eliminated (step S204: Yes), the switch driving unit 3a determines whether the frequency of the cutoff of the inter-system switch 41 and the reconnection of the inter-system switch 41 by the secondary ground fault detection unit 32 is equal to or higher than a predetermined frequency (step S205).

When it is determined that the frequency is equal to or higher than the predetermined frequency (step S205: Yes), the switch driving unit 3a extends the cutoff prohibition period (step S208), prohibits the reconnection of the inter-system switch 41 during the same trip (step S209), and ends the processing.

When it is determined that the frequency of the cutoff of the inter-system switch 41 and the reconnection of the inter-system switch 41 by the secondary ground fault detection unit 32 is not equal to or higher than the predetermined frequency (step S205: No), the switch driving unit 3a sets the cutoff prohibition period of the inter-system switch 41 (step S206), reconnects the inter-system switch 41 (step S207), and ends the processing.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCE SIGNS LIST 1, 1a power supply control apparatus
10 first power supply
11 DC/DC
12 PbB
20 second power supply
21 Lib
3, 3a switch driving unit
31 primary ground fault detection unit
32 secondary ground fault detection unit
33 mask processing unit
34 OR logic circuit
35 frequency detection unit
36 cutoff prohibition unit
41 inter-system switch
42 battery switch
51 first voltage sensor
52 second voltage sensor
100 automated driving control device
101 first load
102 general load
103 second load
110 first system
120 second system

What is claimed is:

1. A power supply control apparatus comprising:
a first system configured to supply electric power of a first power supply to a first load;
a second system configured to supply electric power of a second power supply to a second load;
an inter-system switch provided in a connection path that connects the first system to the second system, and capable of connecting the first system to the second system and disconnecting the first system from the second system;
a primary ground fault detection hardware circuit configured to cut off the inter-system switch when a ground fault of the first system or the second system is detected by the primary ground fault detection hardware circuit; and
at least one processor configured to implement:
monitoring the first system or the second system where the ground fault continues for a predetermined period in a case where the ground fault of the first system or the second system is detected by the primary ground fault detection hardware circuit, and reconnecting the inter-system switch when the ground fault is eliminated; and
setting a cutoff prohibition period when the inter-system switch is reconnected, and prohibiting cutoff of the inter-system switch by the primary ground fault detection hardware circuit during the cutoff prohibition period.

2. The power supply control apparatus according to claim 1,
wherein the at least one processor is configured to extend the cutoff prohibition period in a case where the ground fault is detected again by the primary ground fault detection hardware circuit within a predetermined time after the reconnection of the inter-system switch.

3. The power supply control apparatus according to claim 2,
wherein the at least one processor is configured to prohibit automated driving during a same trip in a case where the cutoff prohibition period is extended.

4. A power supply control apparatus comprising:
a first system configured to supply electric power of a first power supply to a first load;
a second system configured to supply electric power of a second power supply to a second load;
an inter-system switch provided in a connection path that connects the first system to the second system, and capable of connecting the first system to the second system and disconnecting the first system from the second system; and
at least one processor configured to implement:
cutting off the inter-system switch when a ground fault of the first system or the second system is detected by the at least one processor;
monitoring the first system or the second system where the ground fault continues for a predetermined period in a case where the ground fault of the first system or the second system is detected by the at least one processor, and reconnecting the inter-system switch when the ground fault is eliminated; and
setting a cutoff prohibition period when the inter-system switch is reconnected, and prohibiting cutoff of the inter-system switch by the at least one processor during the cutoff prohibition period.

5. The power supply control apparatus according to claim 4,
wherein the at least one processor is configured to extend the cutoff prohibition period in a case where the ground fault is detected again by at least one processor within a predetermined time after the reconnection of the inter-system switch.

6. The power supply control apparatus according to claim 5,
wherein the at least one processor is configured to prohibit automated driving during a same trip in a case where the cutoff prohibition period is extended.

7. A power supply control apparatus comprising:
a first system configured to supply electric power of a first power supply to a first load;
a second system configured to supply electric power of a second power supply to a second load;
an inter-system switch provided in a connection path that connects the first system to the second system, and capable of connecting the first system to the second system and disconnecting the first system from the second system;
a primary ground fault detection hardware circuit configured to cut off the inter-system switch when a ground fault of the first system or the second system is detected by the primary ground fault detection hardware circuit; and
at least one processor configured to implement:
monitoring the first system or the second system where the ground fault continues for a predetermined period in a case where the ground fault of the first system or the second system is detected by the primary ground fault detection hardware circuit, and reconnecting the inter-system switch when the ground fault is eliminated;
detecting frequency of the cutoff of the inter-system switch by the primary ground fault detection hardware circuit and the reconnection of the inter-system switch by the at least one processor; and
prohibiting the cutoff of the inter-system switch when the frequency is equal to or higher than a predetermined frequency.

8. The power supply control apparatus according to claim 7, wherein
the at least one processor is configured to further implement: setting a cutoff prohibition period in which the cutoff of the inter-system switch is prohibited by the at least one processor when the inter-system switch is reconnected by the at least one processor,
wherein the at least one processor is configured to extend the cutoff prohibition period when the frequency is equal to or higher than a predetermined frequency.

9. The power supply control apparatus according to claim 7,
wherein the at least one processor is configured to prohibit the cutoff of the inter-system switch during a same trip when the frequency is equal to or higher than a predetermined frequency.

10. The power supply control apparatus according to claim 8,
wherein the at least one processor is configured to prohibit the cutoff of the inter-system switch during a same trip when the frequency is equal to or higher than a predetermined frequency.

11. A power supply control apparatus comprising:
a first system configured to supply electric power of a first power supply to a first load;
a second system configured to supply electric power of a second power supply to a second load;
an inter-system switch provided in a connection path that connects the first system to the second system, and capable of connecting the first system to the second system and disconnecting the first system from the second system; and
at least one processor configured to implement:
cutting off the inter-system switch when a ground fault of the first system or the second system is detected by the at least one processor;
monitoring the first system or the second system where the ground fault continues for a predetermined period in a case where the ground fault of the first system or the second system is detected by the at least one processor, and reconnecting the inter-system switch when the ground fault is eliminated;
detecting frequency of the cutoff of the inter-system switch by the at least one processor and the reconnection of the inter-system switch by the at least one processor; and
prohibit the cutoff of the inter-system switch when the frequency is equal to or higher than a predetermined frequency.

12. The power supply control apparatus according to claim 11, wherein
the at least one processor is configured to further implement: setting a cutoff prohibition period in which the cutoff of the inter-system switch is prohibited by the at least one processor when the inter-system switch is reconnected by the at least one processor,
wherein the at least one processor is configured to extend the cutoff prohibition period when the frequency is equal to or higher than a predetermined frequency.

13. The power supply control apparatus according to claim 11,
wherein the at least one processor is configured to prohibit the cutoff of the inter-system switch during a same trip when the frequency is equal to or higher than a predetermined frequency.

14. The power supply control apparatus according to claim 12,
wherein the at least one processor is configured to prohibit the cutoff of the inter-system switch during a same trip when the frequency is equal to or higher than a predetermined frequency.

* * * * *